United States Patent
Ichimura et al.

(10) Patent No.: US 10,481,280 B2
(45) Date of Patent: Nov. 19, 2019

(54) RADIATION DETECTING APPARATUS, RADIATION DETECTING SYSTEM, AND MANUFACTURING METHOD FOR RADIATION DETECTING APPARATUS

(71) Applicant: CANON KABUSHIKI KAISHA, Tokyo (JP)

(72) Inventors: Tomoaki Ichimura, Kawasaki (JP); Youjirou Hiratsuka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 350 days.

(21) Appl. No.: 15/634,922

(22) Filed: Jun. 27, 2017

(65) Prior Publication Data

US 2018/0011206 A1    Jan. 11, 2018

(30) Foreign Application Priority Data

Jul. 7, 2016   (JP) .................................. 2016-135411
Jul. 7, 2016   (JP) .................................. 2016-135412

(51) Int. Cl.
   *G01T 1/20*     (2006.01)
   *G01T 1/208*    (2006.01)
   *G01T 7/00*     (2006.01)
   *G01T 1/29*     (2006.01)

(52) U.S. Cl.
   CPC ............ *G01T 1/2018* (2013.01); *G01T 1/208* (2013.01); *G01T 1/2928* (2013.01); *G01T 7/00* (2013.01)

(58) Field of Classification Search
   CPC ..... G01T 1/2018; G01T 1/2928; G01T 1/208; G01T 7/00
   See application file for complete search history.

(56) References Cited

U.S. PATENT DOCUMENTS

| 5,847,499 | A | * | 12/1998 | Rieppo | ..................... H05G 1/64 313/365 |
| 6,667,480 | B2 | | 12/2003 | Kajiwara | |
| 8,492,726 | B2 | | 7/2013 | Yokoyama | |

(Continued)

FOREIGN PATENT DOCUMENTS

| CN | 1774809 A | 5/2006 |
| CN | 101688919 B | 10/2012 |

(Continued)

*Primary Examiner* — David P Porta
*Assistant Examiner* — Meenakshi S Sahu
(74) *Attorney, Agent, or Firm* — Canon U.S.A., Inc. IP Division (57) ABSTRACT

A radiation detecting apparatus includes a scintillator, a pixel array in which a plurality of pixels that each converts visible light converted by the scintillator into electric signals is arranged in a two-dimensional array form on a first surface of a substrate, a plurality of connection terminal portions arranged on a periphery of the pixel array on the first surface of the substrate, and a conductive member to which a constant potential is supplied, wherein the conductive member, the pixel array, and the scintillator are arranged in this order from a side irradiated with radiation, and the scintillator is arranged on a first surface side, and wherein the conductive member is arranged in a region of a second surface opposite to the first surface of the substrate except for a region opposite to the plurality of connection terminal portions.

19 Claims, 11 Drawing Sheets

(56) References Cited

U.S. PATENT DOCUMENTS

2013/0048863 A1* 2/2013 Ohta .................... H01L 27/308
   250/366
2013/0334431 A1  12/2013 Ichimura
2014/0239183 A1   8/2014 Yamazaki
2015/0369926 A1  12/2015 Ichimura

FOREIGN PATENT DOCUMENTS

| CN | 103348263 A | 10/2013 |
| CN | 105474395 A | 4/2016 |
| JP | 2003-262675 A | 9/2003 |
| JP | 2006-258550 A | 9/2006 |
| JP | 3131108 U | 4/2007 |
| JP | 2012-112726 A | 6/2012 |

* cited by examiner

ENLARGEMENT OF PORTION C

RADIATION DETECTING APPARATUS, RADIATION DETECTING SYSTEM, AND MANUFACTURING METHOD FOR RADIATION DETECTING APPARATUS

BACKGROUND OF THE INVENTION

Field of the Invention

The present invention relates to a radiation detecting apparatus that is usable in an apparatus, such as a medical-image diagnostic apparatus, a nondestructive inspection apparatus, an analyzer using radiation or a radiation detecting system, and to a manufacturing method for the radiation detecting apparatus.

Description of the Related Art

A technique for manufacturing a thin-film semiconductor has recently been applied to a radiation detecting apparatus or to a detecting apparatus that is a combination of a switch element such as a thin-film transistor (TFT) and a conversion element such as a photoelectric conversion element. Japanese Patent Application Laid-Open No. 2012-112726 discusses a configuration of a radiation detecting apparatus in which a pixel array is arranged on a side where radiation generated from a radiation source is incident, and a scintillator is arranged on a side opposite to the side where radiation is incident. Japanese Patent Application Laid-Open No. 2012-112726 discusses the radiation detecting apparatus in which a conductive member, to which a fixed potential is supplied, the pixel array and the scintillator are arranged in this order from the side where radiation is incident in order to suitably reduce the influence of electromagnetic noise entering from the radiation incident side of the pixel array.

However, in Japanese Patent Application Laid-Open No. 2012-112726, in which a region of a substrate on which the pixel array is provided the conductive member is arranged is not amply studied. In a case where the pixel array is provided on a first surface of a substrate and the conductive member is fixed on a second surface of the substrate opposite to the first surface, a malfunction may occur depending on the region in which the conductive member is fixed. For example, a connection terminal portion for electrically connecting the pixel array to an external circuit (e.g., a flexible wiring board and a printed circuit board) is arranged on the periphery of the pixel array on the first surface of the substrate. When characteristics of the radiation detecting apparatus are inspected subsequent to connection of the external circuit to the connection terminal portion, the inspection of the characteristics is affected by electromagnetic noise from a second surface side of the substrate without the conductive member, so that the characteristics are not properly inspected. When the characteristics are inspected, thus, it is desirable that the conductive member be fixed on the second surface side of the substrate. However, in a case where a failure is found in the external circuit, by the inspection of the characteristics, electrical mounting needs to be performed again for replacement of the external circuit. The conductive member may be fixed to a region provided on the second surface of the substrate and opposite to the connection terminal portion. In such a case, breakage of the substrate can occur when the external circuit is fixed to the connection terminal portion by processes such as pressure treatment and heat treatment.

SUMMARY OF THE INVENTION

The present invention is directed to a radiation detecting apparatus in which a conducive member to which a fixed potential is supplied, a pixel array, and a scintillator are arranged in this order from a side thereof irradiated with radiation to enhance productivity and maintainability while enhancing electromagnetic shielding performance.

According to an aspect of the present invention, a radiation detecting apparatus includes a scintillator configured to convert irradiated radiation into visible light, a pixel array in which a plurality of pixels that convert the visible light converted by the scintillator into electric signals is arranged in a two-dimensional array form on a first surface of a substrate, a plurality of connection terminal portions arranged on periphery of the pixel array on the first surface of the substrate and configured to electrically connect the pixel array to an external circuit, and a conductive member to which a constant potential is supplied, wherein the conductive member, the pixel array, and the scintillator are arranged in this order from a side irradiated with radiation, and the scintillator is arranged on a first surface side, and wherein the conductive member is arranged in a region on a second surface opposite to the first surface of the substrate except for a region opposite to the plurality of connection terminal portions.

Further features of the present invention will become apparent from the following description of exemplary embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

DESCRIPTION OF THE EMBODIMENTS

Hereinafter, exemplary embodiments of the present invention are described with reference to the drawings. As used herein, the term "radiation" includes not only an alpha ray that is a beam made of particles (including photon) released by radioactive decay, a beta ray, and a gamma ray, but also a beam having energy that is substantially the same or greater than that of the alpha ray, the beta ray, or the gamma ray. Examples of such, alpha and beta particles and gamma rays, include a beam include an X-ray, a particle beam, and a cosmic ray.

Figure 1A:
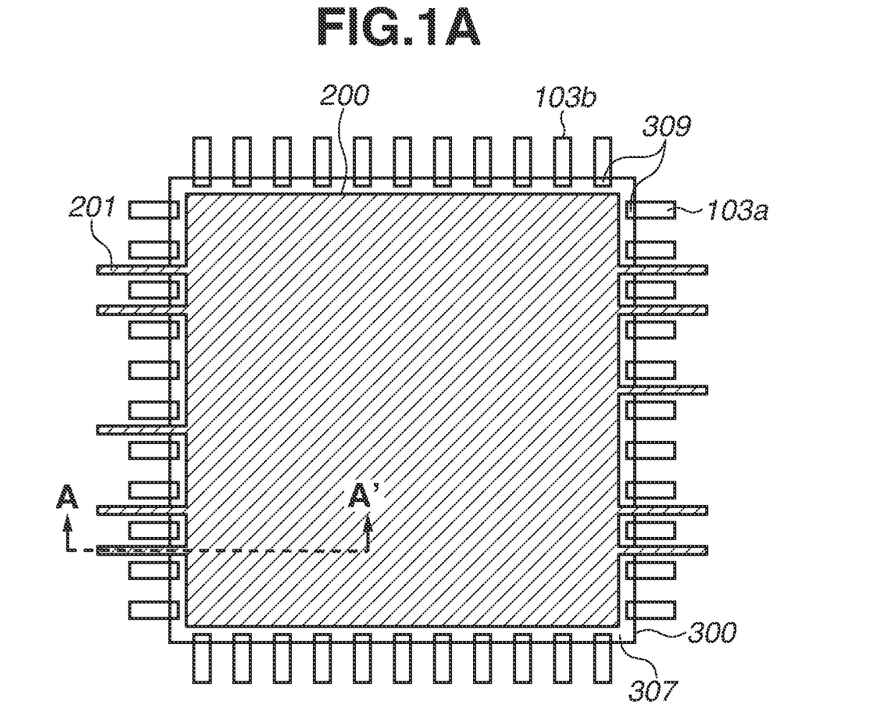
FIGS. 1A and 1B are respectively a plan view and a sectional view schematically illustrating a configuration of a radiation detecting apparatus.
Figure 1B:
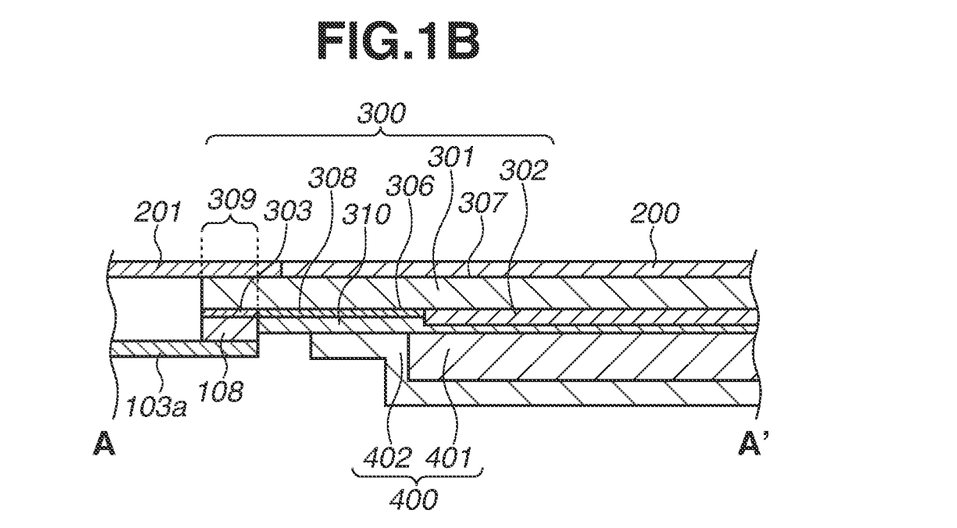
Figure 2:
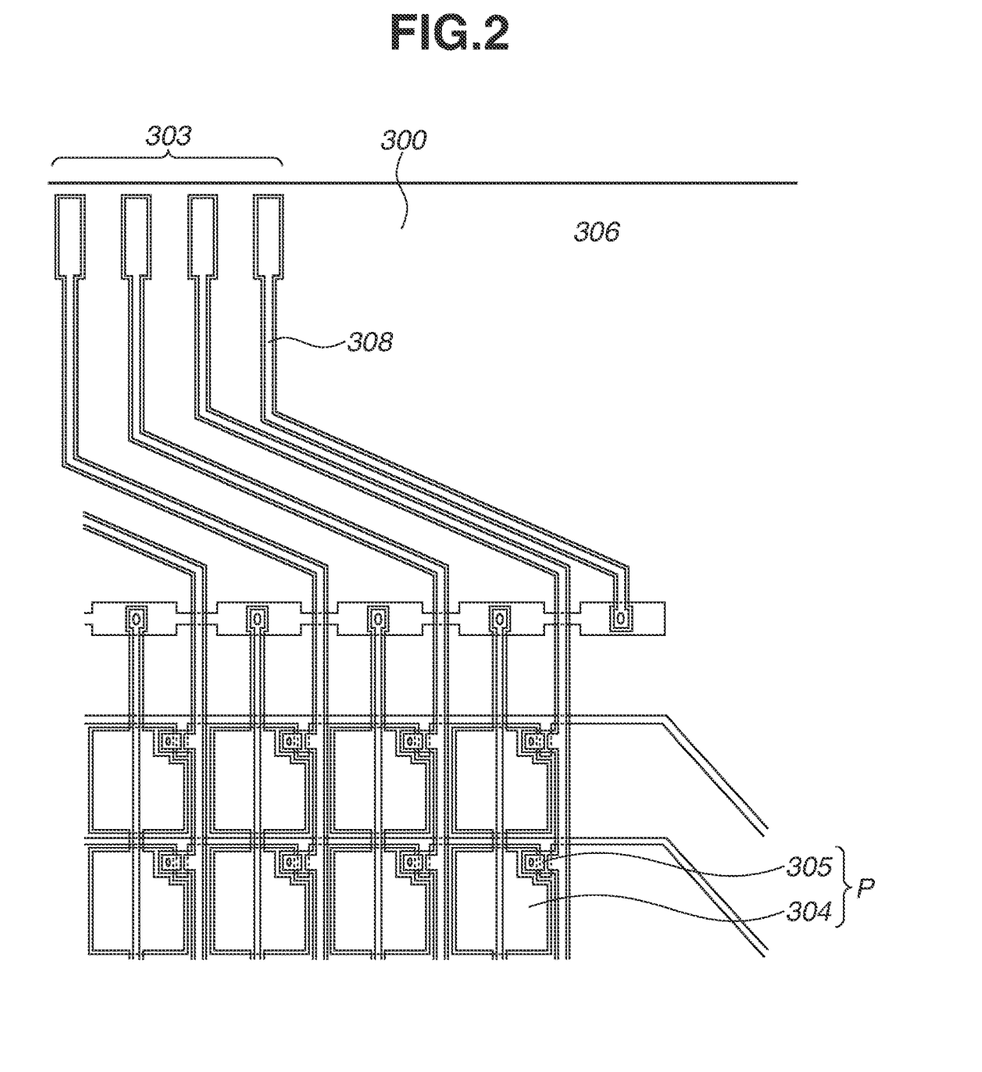
FIG. 2 is a plan view schematically illustrating a configuration of a sensor panel of the radiation detecting apparatus.

First, a schematic configuration of a radiation detecting apparatus according to an exemplary embodiment of the present invention is described with reference FIGS. 1A, 1B, and 2. FIG. 1A is a plan view illustrating the radiation detecting apparatus excluding a housing. FIG. 1B is a sectional view along the line A-A' of FIG. 1A, and illustrates the radiation detecting apparatus excluding the housing. FIG. 2 is a plan view illustrating a configuration of a sensor panel of the radiation detecting apparatus.

As illustrated in FIGS. 1A, 1B, and 2, the radiation detecting apparatus of the present exemplary embodiment includes a scintillator 400, a pixel array 302, a plurality of connection terminal portions 303, and a conductive member 200. The scintillator 400 converts emitted radiation into visible light. The scintillator 400 can include a scintillator layer 401 that converts the radiation into the visible light, and a protection member 402 that protects the scintillator layer 401. The pixel array 302 includes a plurality of pixels P that convert the visible light converted by the scintillator 400 into electric signals. The plurality of pixels P is arranged in a two-dimensional array form on a first surface 306 of a substrate 301. The substrate 301 includes a second surface 307 opposite to the first surface 306. Each of the pixels P can include a photoelectric conversion element 304 and a switch element 305 such as a TFT. The photoelectric conversion element 304 converts visible light into electric signals, and the switch element controls storage and output of the electric signals acquired by the photoelectric conversion element 304. Each of the plurality of connection terminal portions 303 is arranged on the periphery of the pixel array 302 on the first surface 306 of the substrate 301, and electrically connects the pixel array 302 to an external circuit (which will be described in detail below) via a wiring portion 308. The conductive member 200 is supplied with a constant potential to reduce electromagnetic noise entering from a side (a second surface 307 side) that is irradiated with radiation with respect to the pixel array 302. The conductive member 200, the pixel array 302, and the scintillator 400 are arranged in this order from the side irradiated with radiation, and the scintillator 400 is arranged on a first surface side (a first surface 306 side) of the substrate 301. Herein, the conductive member 200 is arranged in a region across the second surface 307 of the substrate 301 except for a region 309, on the periphery of the substrate 301, opposite to the plurality of connection terminal portions 303. The conductive member 200 can be fixed on the second surface 307 of the substrate 301 via adhesive in the region except for the region 309. Herein, the conductive member 200 is arranged in the region except for the region 309 in such a manner that an edge portion of the conductive member 200 is positioned on the second surface 307 and between an end of a region in which the pixel array 302 is arranged and the region 309 opposite to the plurality of connection terminal portions 303. The pixel array 302 and the wiring portion 308 are covered with a passivation film 310. In this case, the scintillator 400 is arranged on the surface of the passivation film 310 on the first surface 306 side of the substrate 301. Moreover, the protection member 402 covers the scintillator layer 401 and the surface of the passivation film 310 on the periphery of the scintillator layer 401, so that the scintillator layer 401 and at least one portion of the first surface 306 of the substrate 301 are covered. Hence, the protection member 402 protects the scintillator layer 401. The protection member 402 can include a conductive layer to which a constant potential is supplied. In such a case, both surface sides of the pixel array 302 are respectively shielded with the conductive member 200 and the conductive layer of the protection member 402 from electromagnetic noise.

The plurality of connection terminal portions 303 includes a plurality of first connection terminal portions arranged along a first side and a third side opposite to the first side of the substrate 301 of a sensor panel 300 as illustrated in FIG. 1A. The plurality of first connection terminal portions is electrically connected to a drive circuit (not illustrated) for driving the pixel array 302. A plurality of first flexible wiring boards 103b is electrically connected to the plurality of connection terminal portions. Moreover, the plurality of connection terminal portions 303 includes a plurality of second connection terminal portions arranged along a second side adjacent to the first side and a fourth side opposite to the second side of the substrate 301. The plurality of second connection terminal portions is electrically connected to a readout circuit (not illustrated) for reading out electric signals from the pixel array 302. A plurality of second flexible wiring board 103a is electrically connected to the plurality of second connection terminal portions. One set of the connection terminal portions 303 and the flexible wiring board are electrically connected by using conductive adhesive 108 such as an anisotropic conductive film.

A connecting portion 201 electrically connects the conductive member 200 to a constant potential member (that will be described in detail below) for supplying a constant potential to the conductive member 200. As illustrated in FIG. 1A, the connecting portion 201 is arranged on the second side and the fourth side of the substrate 301 so as to pass between the regions 309 provided on the on the second surface 307 and opposite to the plurality of connection terminal portions 303. Moreover, the connecting portion 201 is arranged so as to pass between the plurality of second flexible wiring boards 103a. A signal that passes through the second flexible wiring board 103a is an electric signal generated by the pixel array 302. Such a signal is weaker than a signal that drives a pixel array and passes through the first flexible wiring board 103b. The connecting portion 201 to which a constant potential is supplied is positioned on a second flexible wiring board 103a side. This can enhance electromagnetic noise resistance of the second flexible wiring board 103a through which the weak electric signal passes. Moreover, the connecting portion 201, as illustrated in FIGS. 1A and 1B, can be configured such that one portion of the conductive member 200 is stretched using the same material as the conductive member 200. A sheet-shaped member in which aluminum and polyethylene terephthalate (PET) are laminated can be used as materials of the conductive member 200 and the connecting portion 201. The sheet-shaped member can have a total thickness of 0.05 mm to 0.1 mm. The sheet-shaped member, which can be used for the conductive member 200, has a sheet resistance of 10000Ω/□ or less. Preferably, a plurality of connecting portions 201 is arranged. In the example illustrated in FIG. 1A, the connecting portions 201 are arranged in 10 locations that are five locations on the second side and five locations on the fourth side.

Figure 3:
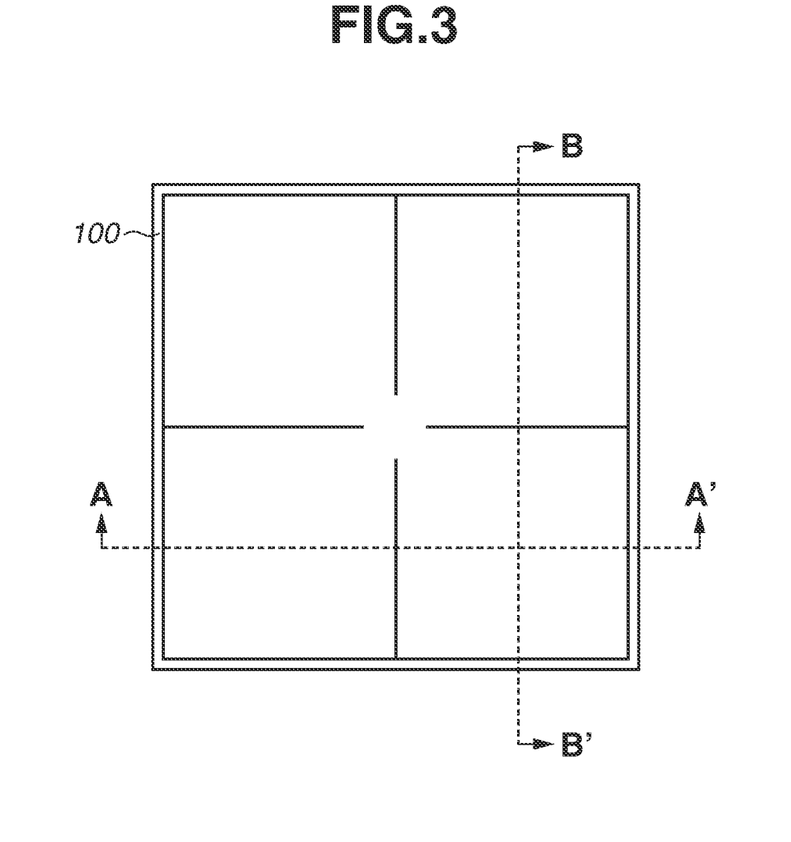
FIG. 3 is a plan view schematically illustrating the entire radiation detecting apparatus.
Figure 4A:
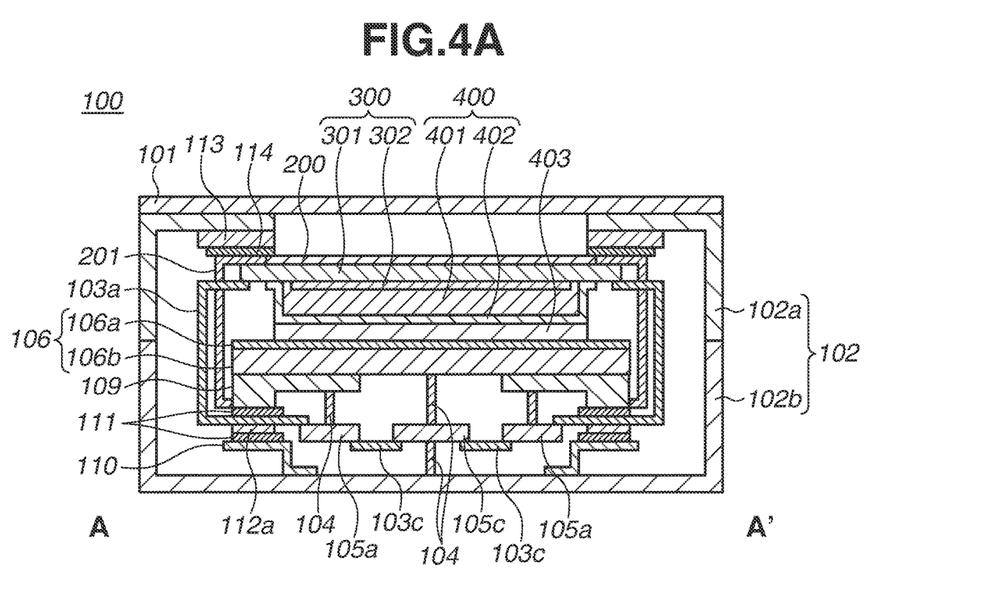
FIGS. 4A and 4B are sectional views each illustrating the entire radiation detecting apparatus.
Figure 4B:
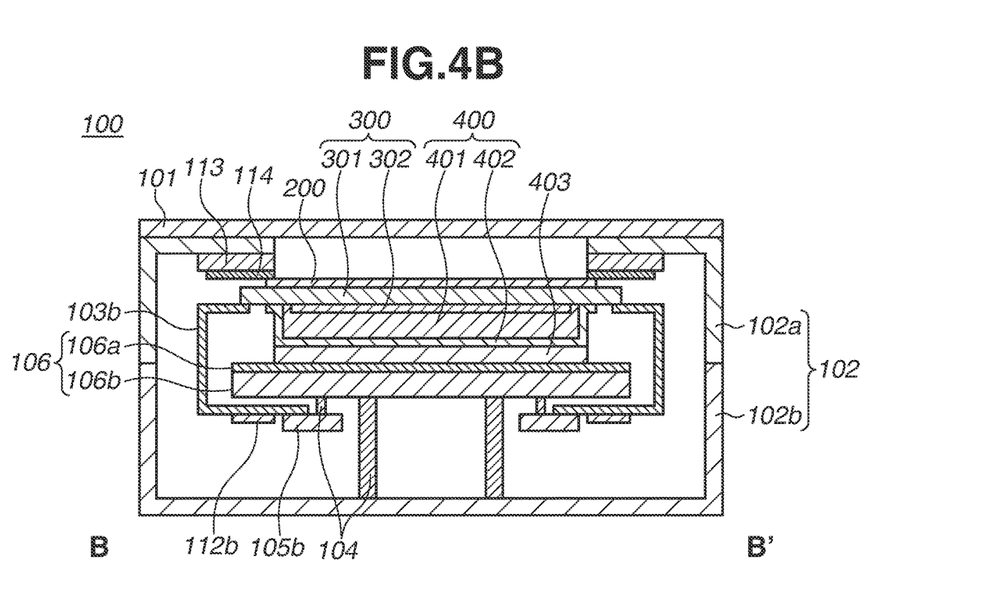

Next, a schematic configuration of the entire radiation detecting apparatus according to the present exemplary embodiment is described with reference to FIGS. 3, 4A, and 4B. FIG. 3A is a plan view of the entire radiation detecting apparatus. FIG. 4A is a sectional view of the radiation detecting apparatus along the line A-A' of FIG. 3, and illustrates the entire radiation detecting apparatus. FIG. 4B is a sectional view of the radiation detecting apparatus along the line B-B' of FIG. 3.

As illustrated in FIGS. 3, 4A, and 4B, the radiation detecting apparatus 100 includes a housing in which the sensor panel 300, the scintillator 400, the conductive member 200, the first flexible wiring board 103b and the second flexible wiring board 103a, and the connecting portion 201 are stored. The housing includes a cover 101 and an exterior box 102 including an exterior box upper portion 102a and an exterior box lower portion 102b. Carbon-fiber reinforced plastic (CFRP) having a thickness of 1 mm to 1.5 mm can be suitably used as the cover 101 of the radiation detecting apparatus 100. The cover 101 is arranged on the side irradiated with radiation. Lightweight strong stainless used steel (SUS) (stainless steel) having a thickness of 1.5 mm to 2.5 mm can be used as each of the exterior box upper portion 102a and the exterior box lower portion 102b. The term "SUS" used herein represents alloyed steel containing iron (Fe) as a main component (50% or more) and chromium (Cr) of 10.5% or more. Accordingly, each of the exterior box upper portion 102a and the exterior box lower portion 102b functions as an electromagnetic shielding with supply of constant potential by grounding, for example. The cover 101 can be fixed to the exterior box upper portion 102a.

In the housing, the radiation detecting apparatus 100 further includes a supporting member 106 for supporting the conductive member 200, the substrate 301 including the pixel array 302, and the scintillator 400 from a side of the scintillator 400. The supporting member 106 includes a radiation absorption plate 106a and a base 106b that are arranged in this order from the side irradiated with radiation (a scintillator 400 side). The base 106b is made of aluminum (Al) having a thickness of 2 mm to 3.5 mm, and the radiation absorption plate 106a is made of SUS having a thickness of 0.25 mm to 1 mm. The radiation absorption plate 106a has higher radiation absorbability than that of the base 106b. The supporting member 106 is fixed to the exterior box lower portion 102b with a screw by using a spacer 104. The supporting member 106 and the protection member 402 of the scintillator 400 are fixed by an adhesive sheet 403 having a cushioning function. The adhesive sheet 403 preferably has a thickness of 0.5 mm to 0.75 mm to have both the cushioning function and adhesiveness. Moreover, the adhesive sheet 403 preferably has an area substantially the same as or larger than that of a surface on a supporting member 106 side of the scintillator 400.

As for the second flexible wiring board 103a as illustrated in FIG. 4A, a chip on film (COF) with a second integrated circuit (IC) 112a having a readout circuit for reading out electric signals from the pixel array can be used. The second IC 112a is electrically connected, via a third flexible wiring board 103c, to an IC having a processing circuit or a power supply circuit provided on a second printed circuit board 105a and an IC having a control circuit arranged on a third printed circuit board 105c. The second IC 112a, the second printed circuit board 105a, the third printed circuit board 105c, and the third flexible wiring board 103c can be arranged between the supporting member 106 and the exterior box lower portion 102b. Thus, these members can be arranged on a side opposite to the side where radiation is irradiated with respect to the radiation absorption plate 106a. Herein, a first electrothermal member 109 made of Al and a heat dissipation member 111 made of heat dissipation rubber are arranged between the second IC 112a and the base 106b made of Al. Such arrangement allows heat generated in the second IC 112a to be transferred and diffused to the base 106b, and thus heat concentration is reduced. Moreover, a second electrothermal member 110 made of Al and the heat dissipation member 111 made of heat dissipation rubber are arranged between the second IC 112a and the exterior box lower portion 102b. This allows heat generated in the second IC 112a to be transferred to the exterior box lower portion 102b, and then dissipated outside via the exterior box lower portion 102b. Moreover, the second printed circuit board 105a is fixed on the base 106b via the spacer 104, whereas the third printed circuit board 105c is fixed on the base 106b and the exterior box lower portion 102b via the spacer 104. The spacer 104 can have a heat transfer function in addition to a position regulating function if a material having higher thermal conductivity than that of the air is used for the spacer 104.

Moreover, as for the first flexible wiring board 103b as illustrated in FIG. 4B, a COF with a first IC 112b having a drive circuit for driving a pixel array can be used. The first IC 112b is electrically connected to an IC having a power supply circuit provided on a first printed circuit board 105b. The first IC 112b and the first printed circuit board 105b can be arranged between the supporting member 106 and the exterior box lower portion 102b. Thus, these members can be arranged on a side opposite to the side where radiation is irradiated with respect to the radiation absorption plate 106a.

On the other hand, a spacer 113 and a cushioning member 114 are arranged between the substrate 301 and the conductive member 200, and the exterior box upper portion 102a, and positions of the substrate 301 and the conductive member 200 are regulated with respect to the exterior box upper portion 102a. The spacer 113 is made of SUS having a thickness of 1 mm to 2.5 mm, and has higher radiation absorbability than that of the base 106b. The use of the radiation absorption plate 106a and the spacer 113 maintains radiation absorbability of the entire radiation detecting apparatus.

Herein, the connecting portion 201 is fixed to the supporting member 106 so as to be electrically connected to the base 106b. The base 106b of the supporting member 106 is electrically connected to the housing or a constant potential portion of the power supply circuit with a metal member such as a screw used in the spacer 104, so that a fixed potential is supplied. Thus, the base 106b functions as a constant potential member. Accordingly, the electrical connection of the connecting portion 201 to the base 106b enables a constant potential to be supplied to the conductive member 200. The constant potential to be supplied can be a ground potential provided by grounding or a constant potential generated by any of the power supply circuits.

Figure 5A:
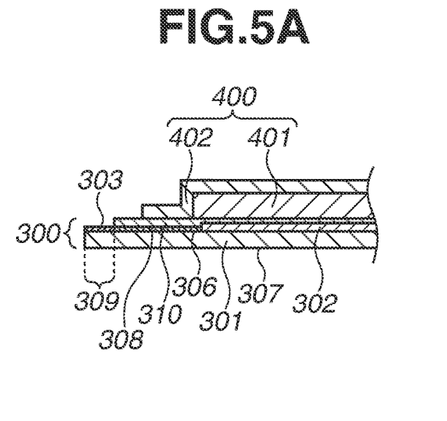
FIGS. 5A to 5F are sectional views schematically illustrating respective processes in a manufacturing method for the radiation detecting apparatus.

Next, processes in a manufacturing method for the radiation detecting apparatus are respectively described with reference to FIGS. 5A to 5F. As illustrated in FIG. 5A, the scintillator 400 is prepared on the surface of the passivation film 310 on the first surface 306 side of the sensor panel 300 in such a manner that the pixel array 302 is covered. Herein, the scintillator 400 can be prepared by forming the scintillator layer 401 and the protection member 402. The scintillator layer 401 is formed to cover the pixel array 302, and then the protection member 402 is formed to cover the scintillator layer 401 and one portion of the surface of the passivation film 310 on the periphery of the pixel array 302. For the scintillator layer 401, an alkali halide-based scintillator layer having a columnar crystal structure prepared by deposition of cesium iodide according to a vacuum deposition method can be used. The protection member 402 can be prepared by fixing a conductive layer made of a material such as Al to the scintillator layer 401 and the sensor panel 300 with an adhesive layer made of hotmelt resin.

Figure 5B:
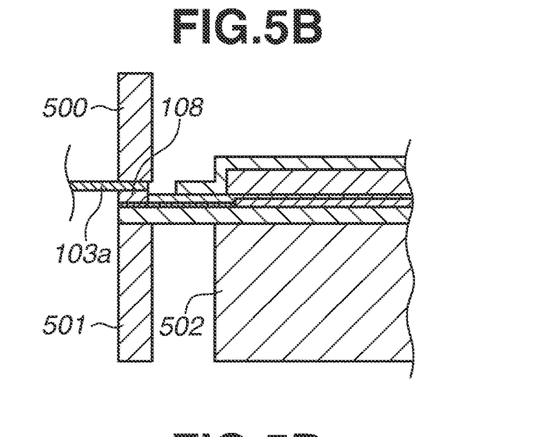

Next, as illustrated in FIG. 5B, the sensor panel 300 including the scintillator 400 is placed on a pressure-bonding apparatus stage 502 with the second surface 307 side of the substrate 301 facing downward. Then, a receiving member 501 is arranged in the region 309 opposite to the plurality of connection terminal portions 303. In this state, a flexible wiring board undergoes heat pressure processing is performed by a compression head 500 on the flexible wiring board (i.e., second flexible wiring board 103a in FIG. 5B) via an anisotropic conductive film. Accordingly, the flexible wiring board is electrically connected to the plurality of connection terminal portions 303 via the conductive adhesive 108.

Figure 5C:
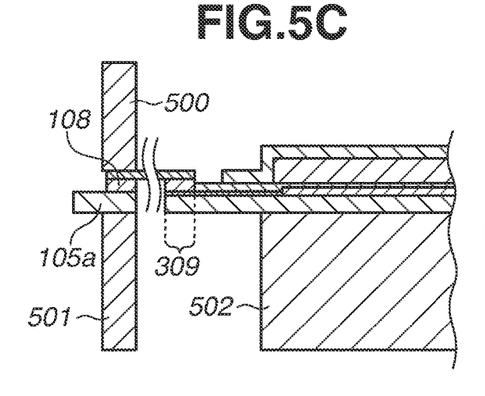

Subsequently, as illustrated in FIG. 5C, the printed circuit board (i.e., second printed circuit board 105a in FIG. 5c) is supported by the receiving member 501 from the lower side thereof, and heat pressure processing is performed by the compression head 500 on the flexible wiring board via the anisotropic conductive film. Accordingly, the printed circuit board is electrically connected to the flexible wiring board via the conductive adhesive 108. The process for electrically connecting the printed circuit board to the plurality of connection terminal portions 303 via the flexible wiring board is referred to as a connection process.

Figure 5D:
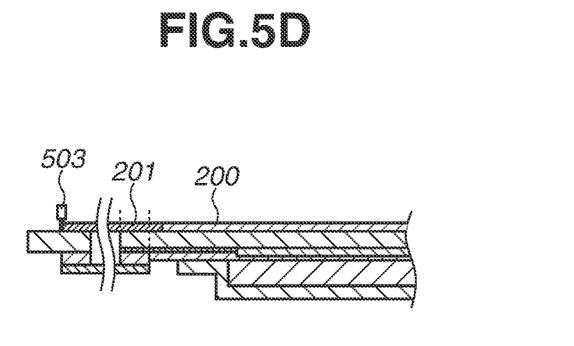

Subsequently, as illustrated in FIG. 5D, an inspection process is performed to inspect electric characteristics of the pixel array 302, the plurality of flexible wiring boards, and the printed circuit board. In the inspection process, the conductive member 200 is electrically connected to at least one of the plurality of printed circuit boards via the connecting portion 201 and a fixing screw 503. In this manner, a constant potential can be supplied from the printed circuit board to the conductive member 200 via the connecting portion 201 in the inspection process. Thus, influence of electromagnetic noise from the second surface 307 side of the substrate 301 can be reduced even in the inspection process. Accordingly, the inspection process can be performed more appropriately, and productivity can be ensured. Similarly, a constant potential is supplied to the conductive layer of the protection member 402, and influence of electromagnetic noise from the first surface 306 side can also be reduced thereby.

Figure 5E:
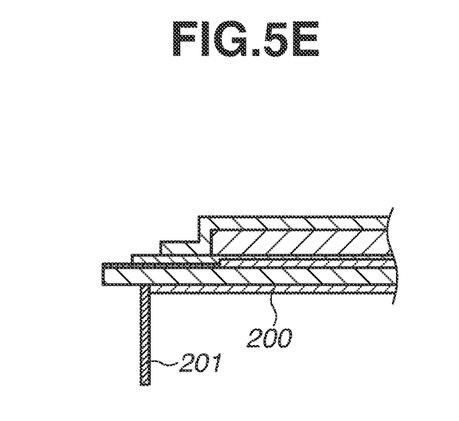

In a case where a failure is found in any of the plurality of flexible wiring boards by the inspection process, the flexible wiring board with the failure is removed from the plurality of connection terminal portions 303 as illustrated in FIG. 5E. When the flexible wiring board with the failure is removed, the connecting portion 201 is electrically disconnected from the printed circuit board as illustrated in FIG. 5E.

Figure 5F:
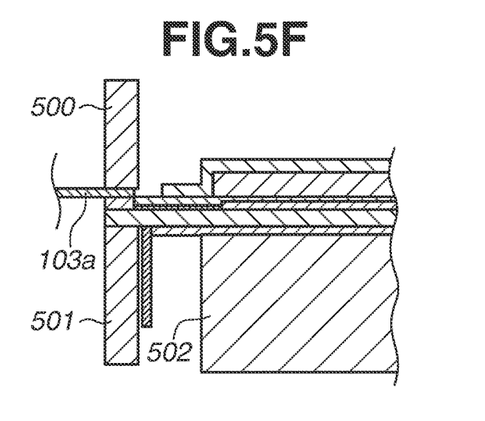

Then, as illustrated in FIG. 5F, a normal flexible circuit substrate is electrically connected to the plurality of connection terminal portions 303 again in a state in which the connecting portion 201 remains electrically disconnected. Subsequently, the connection process and the inspection process described above with reference to FIGS. 5C and 5D are performed again. Accordingly, replacement of an electrical component having a failure is facilitated, so that maintainability can be enhanced.

Figure 6A:
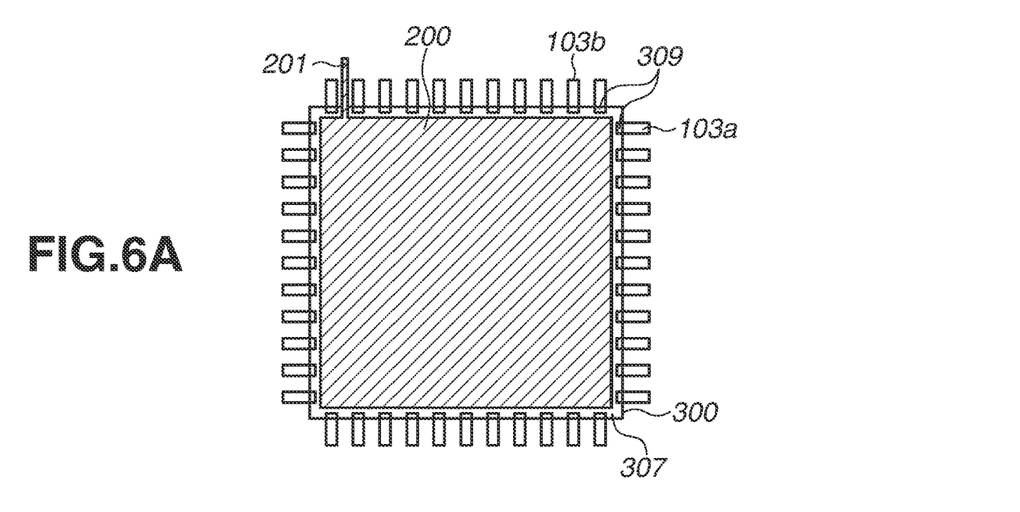
FIGS. 6A to 6C are plan views schematically illustrating other examples of radiation detecting apparatuses.
Figure 6B:
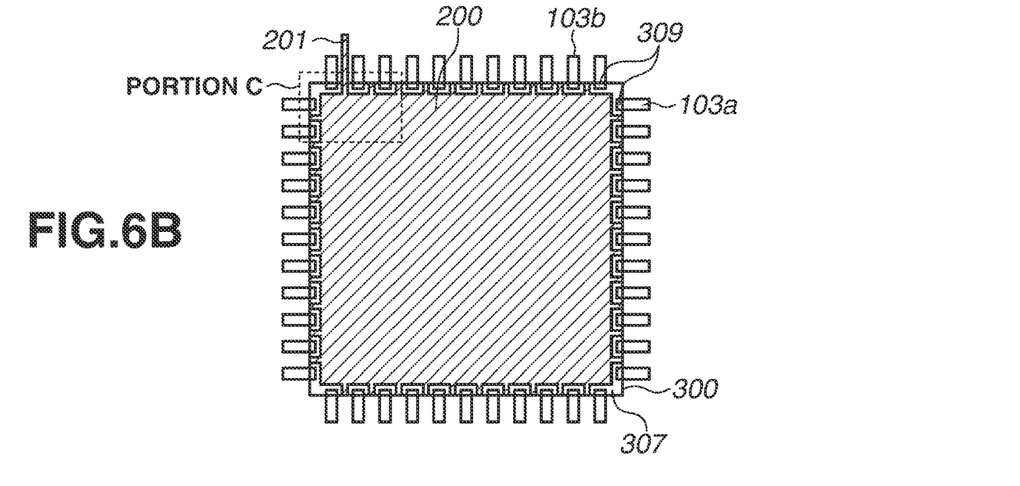
Figure 6C:
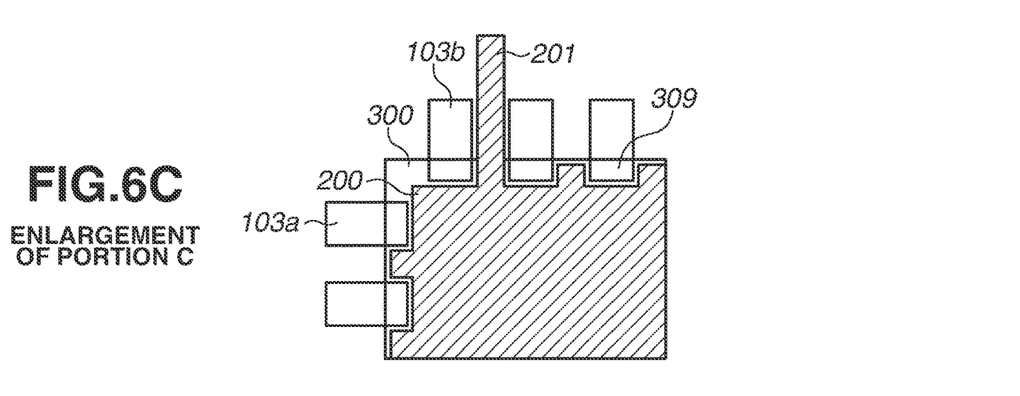

In the example illustrated in FIG. 1A, the connecting portion 201 is arranged on the second side and the fourth side of the substrate 301 so as to pass between the regions 309 and between the plurality of second flexible wiring boards 103a. However, the configuration is not limited thereto. For example, as illustrated in FIG. 6A, the connecting portion 201 may be arranged on the first side and the third side of the substrate 301 so as to pass between the regions 309 and between the plurality of first flexible wiring boards 103b. Moreover, as illustrated in FIG. 1A, the conductive member 200 is arranged such that an end portion of the conductive member 200 is positioned on the second surface 307 and marks a boundary between the region in which the pixel array 302 is arranged and the region 309 opposite to the plurality of connection terminal portions 303. However, the configuration is not limited thereto. For example, as illustrated in FIGS. 6B and 6C, the conductive member 200 may be arranged such that one portion of an end portion of the conductive member 200 is positioned marks a boundary between a plurality of regions 309 on the second surface 307. With such arrangement, the conductive member 200 can be arranged in a larger area than the example illustrated in FIG. 1A.

Figure 7A:
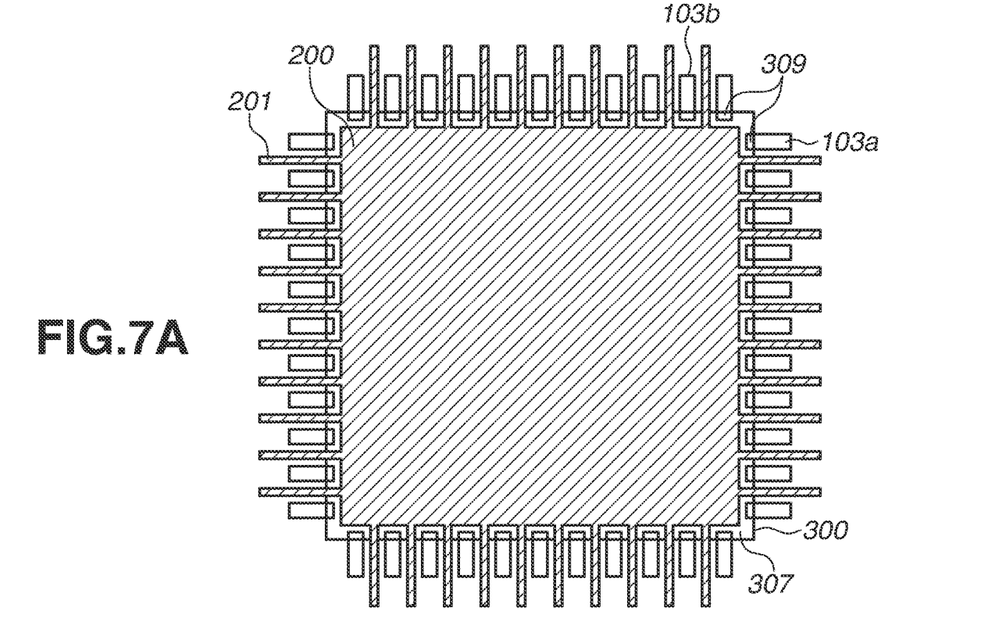
FIGS. 7A and 7B are plan views schematically illustrating other examples of radiation detecting apparatuses.
Figure 7B:
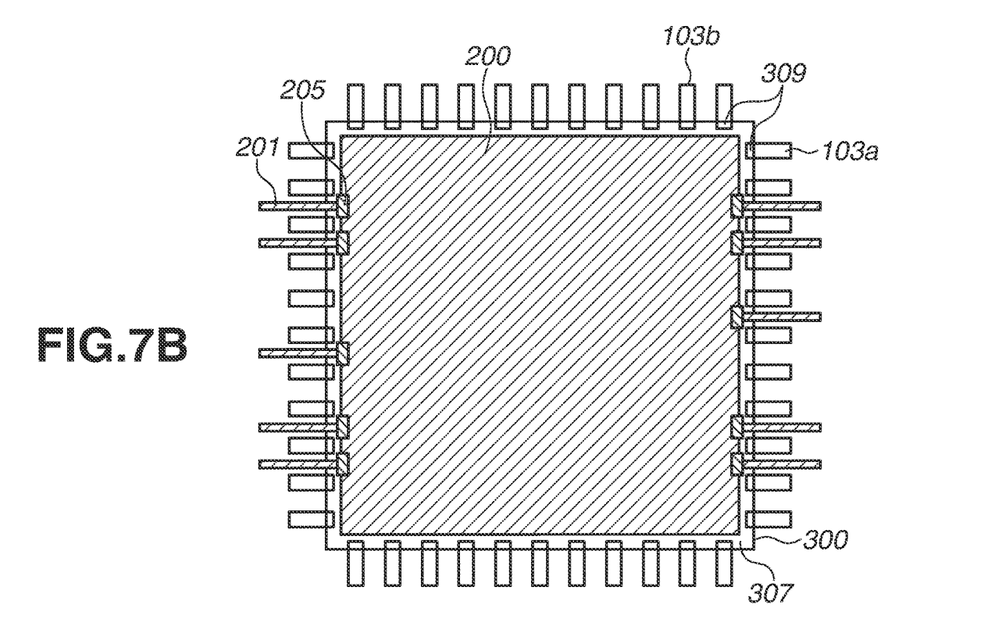

Moreover, as illustrated in FIG. 7A, the number of the connecting portions 201 may be greater than that in the example illustrated in FIG. 1A such that the connecting portions 201 can be arranged between every plurality of first flexible wiring boards and between all of the plurality of second flexible wiring boards. Moreover, in the example illustrated in FIG. 1A, the connecting portion 201 is configured in such a manner that one portion of the conductive member 200 is stretched using the same material as the conductive member 200. However, the configuration is not limited thereto. As illustrated in FIG. 7B, the connecting portion 201 may be arranged separately from the conductive member 200 and electrically connected to the conductive member 200 via conductive adhesive 205.

Figure 8A:
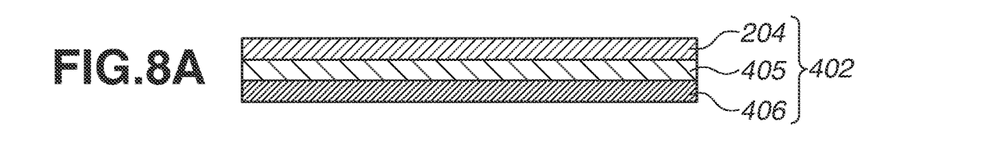
FIGS. 8A to 8D are sectional views each illustrating a scintillator of the radiation detecting apparatus.
Figure 8B:
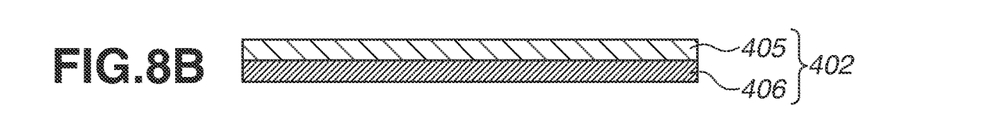
Figure 8C:
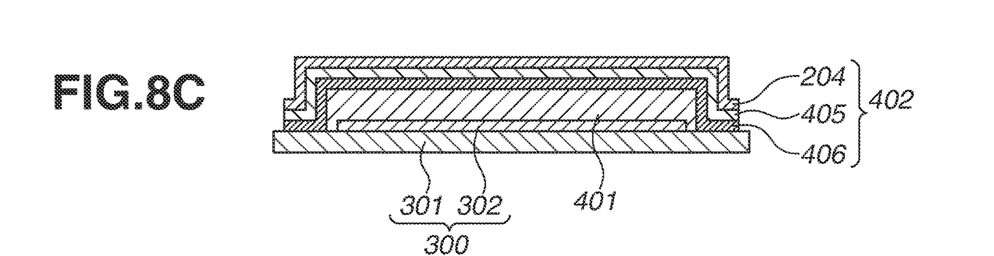
Figure 8D:
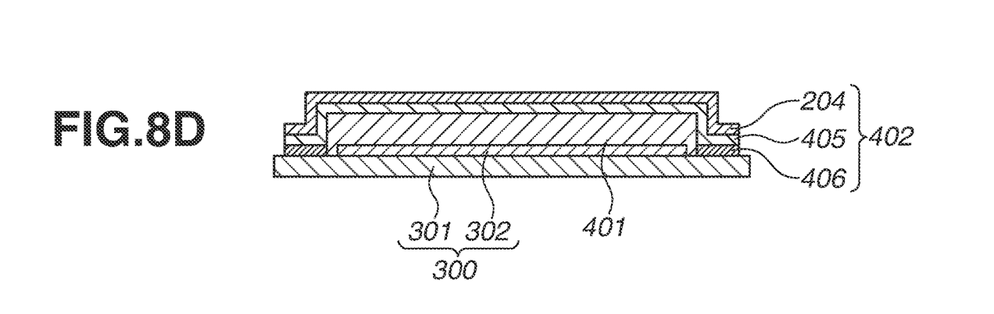

The scintillator 400 arranged on the sensor panel 300 is described in detail with reference to FIGS. 8A to 8D. As illustrated in FIG. 8A, the protection member 402 of the scintillator 400 can include a supporting layer 204, a moisture-proof layer 405, and an adhesive layer 406. The moisture-proof layer 405 protects the scintillator layer 401 from moisture outside, and can include a conductive layer made of a material such as Al. A constant potential is supplied to such a conductive layer, so that the moisture-proof layer 405 can function as an electromagnetic shielding. The supporting layer 204 supports the moisture-proof layer 405. If the moisture-proof layer 405 has adequate rigidity, the supporting layer 204 does not need to be necessarily arranged as illustrated in FIG. 8B. As for the supporting layer 204, a material such as PET can be suitably used. The adhesive layer 406 attaches the moisture-proof layer 405 to the scintillator layer 401 and the sensor panel 300, and hotmelt resin can be preferably used for the adhesive layer 406. An alkali halide-based material may be used for the scintillator layer 401, and a conductive layer may be used for the moisture-proof layer 405. In such a case, as illustrated in FIG. 8C, the adhesive layer 406 can be arranged so as to cover the scintillator layer 401 to prevent electrochemical corrosion. In other cases, as illustrated in FIG. 8D, the adhesive layer 406 can be arranged so as to adhere only to the sensor panel 300 without adhering to the scintillator layer 401.

Figure 9A:
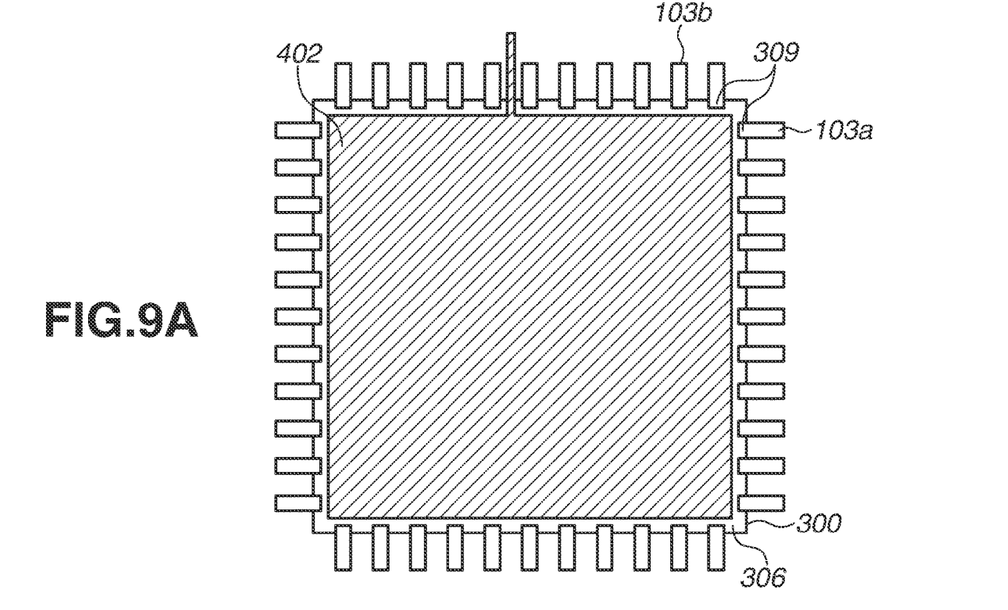
FIGS. 9A and 9B are plan views illustrating other examples of radiation detecting apparatuses.
Figure 9B:
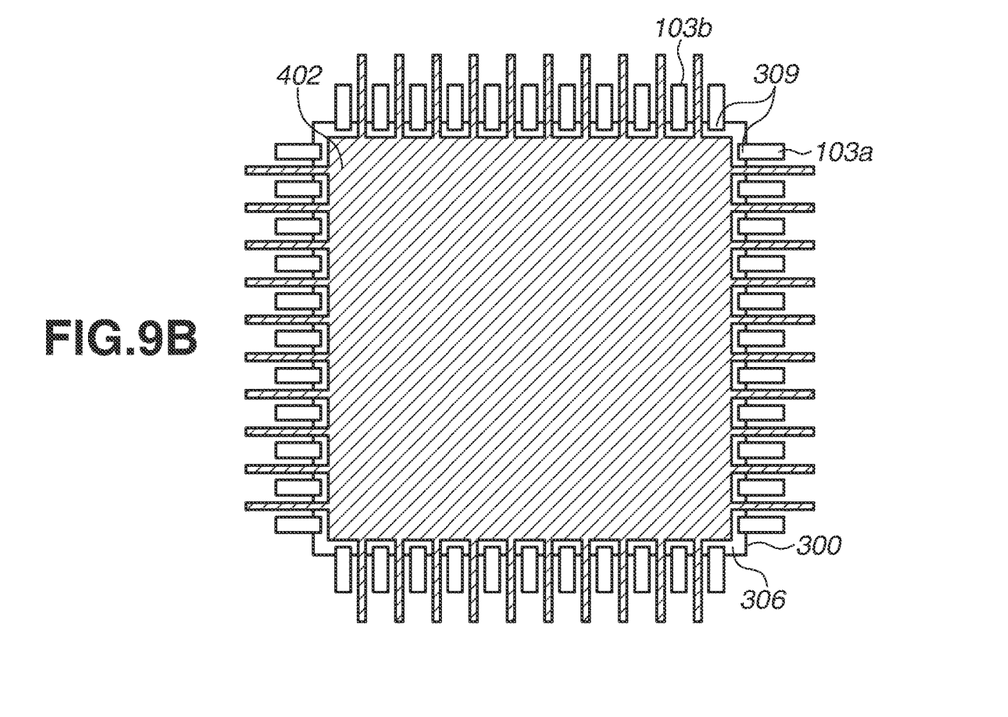

Moreover, as illustrated in FIG. 9A, a conductive layer of the protection member 402 is arranged on the first side or the third side of the substrate 301 so as to pass between the regions 309 and between the plurality of first flexible wiring boards 103b. One portion of the conductive layer of the protection member 402 passing therebetween is electrically connected to the supporting member 106. Thus, a constant potential is supplied to the conductive layer of the protection member 402, and the conductive layer of the protection member 402 can function as an electromagnetic shielding. As illustrated in FIG. 9B, the conductive layer of the protection member 402 may be arranged to pass through more regions 309 so as to be electrically connected to the supporting member 106 through a plurality of paths to enhance the electromagnetic shielding function.

Figure 10A:
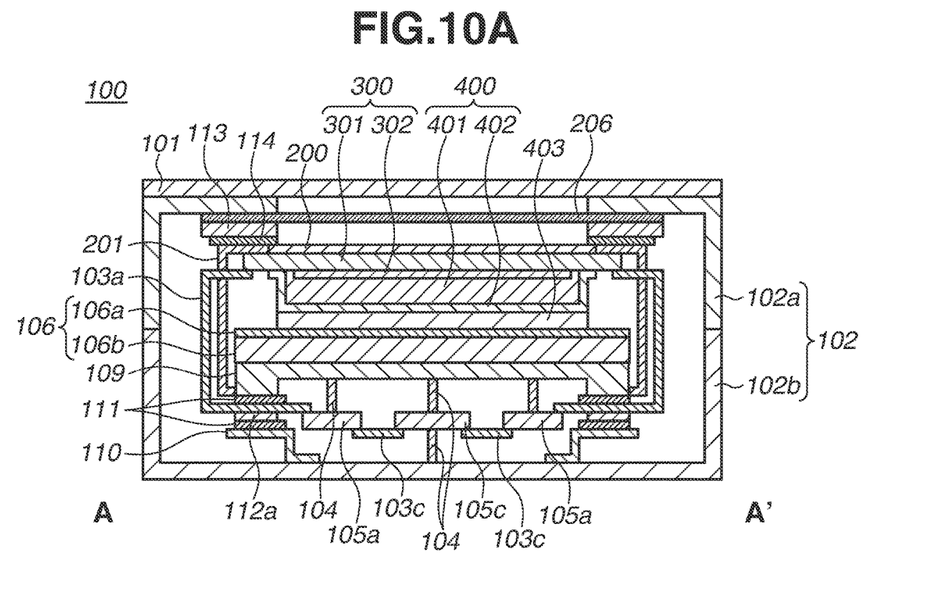
FIGS. 10A and 10B are sectional views each illustrating an entire radiation detecting apparatus according to another exemplary embodiment.
Figure 10B:
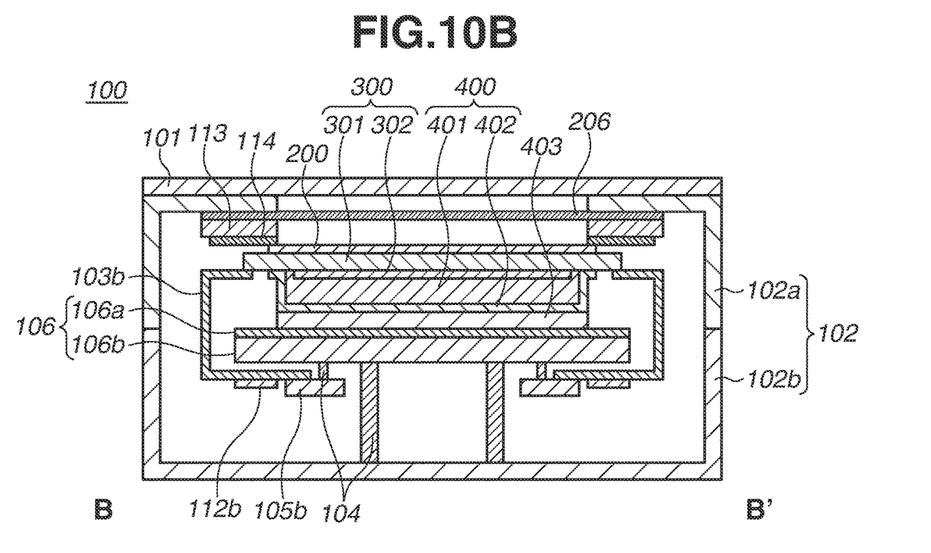

Next, another exemplary embodiment is described with reference to FIGS. 10A and 10B. Configurations that are already described above are given the same reference numerals as above and description thereof will be omitted. In the present exemplary embodiment illustrated in FIGS. 10A and 10B, a second conductive member 206 to which a constant potential is supplied is arranged on a side of a first conductive member 200 where radiation is irradiated inside the housing. The second conductive member 206 is, in other words, arranged between the cover 101 of the housing and the first conductive member 200. Herein, the second conductive member 206 is larger than an orthogonal projection of the first conductive member 200 with respect to the second conductive member 206. That is, an area of the second conductive member 206 is larger than that of the first conductive member 200, and the second conductive member 206 can cover a larger region than the first conductive member 200 does. Such arrangement can reduce influence of electromagnetic noise that can enter from a region of a difference between an area of the cover 101 of the housing and an area of the second conductive member 206. The cover 101 serves as a surface on the side where radiation is irradiated. The second conductive member 206 is arranged between an exterior box upper portion 102a and a spacer 113 as illustrated in FIG. 10B. The second conductive member 206 is electrically connected to the exterior box upper portion 102a, so that a constant potential is supplied thereto from the housing. A sheet-shaped member including aluminum and PET that are laminated therein and having a thickness of 0.07 mm to 0.15 mm can be used as a material of the second conductive member 206. Moreover, the sheet-shaped member, which can be used as the second conductive member 206, has a sheet resistance of 10000Ω/□ or less. The second conductive member 206 preferably has higher rigidity than that of the first conductive member 200 to ensure resistance against impact caused by deformation of the cover 101. Thus, the total thickness of the second conductive member 206 is preferably even thicker. The second conductive member 206 may be directly fixed to the cover 101.

In Japanese Patent Application Laid-Open No. 2012-112726, a conductive member has substantially the same size as that of a substrate on which a pixel array is arranged, and the surface of a housing on the side irradiated with radiation is larger than the substrate in size. Consequently, reduction of electromagnetic noise entering from such a difference is difficult. According to the present exemplary embodiment, the radiation detecting apparatus includes a conductive member to which a fixed potential is supplied, a pixel array, and a scintillator arranged in this order from a side thereof irradiated with radiation, thereby enhancing electromagnetic shielding performance.

Figure 11:
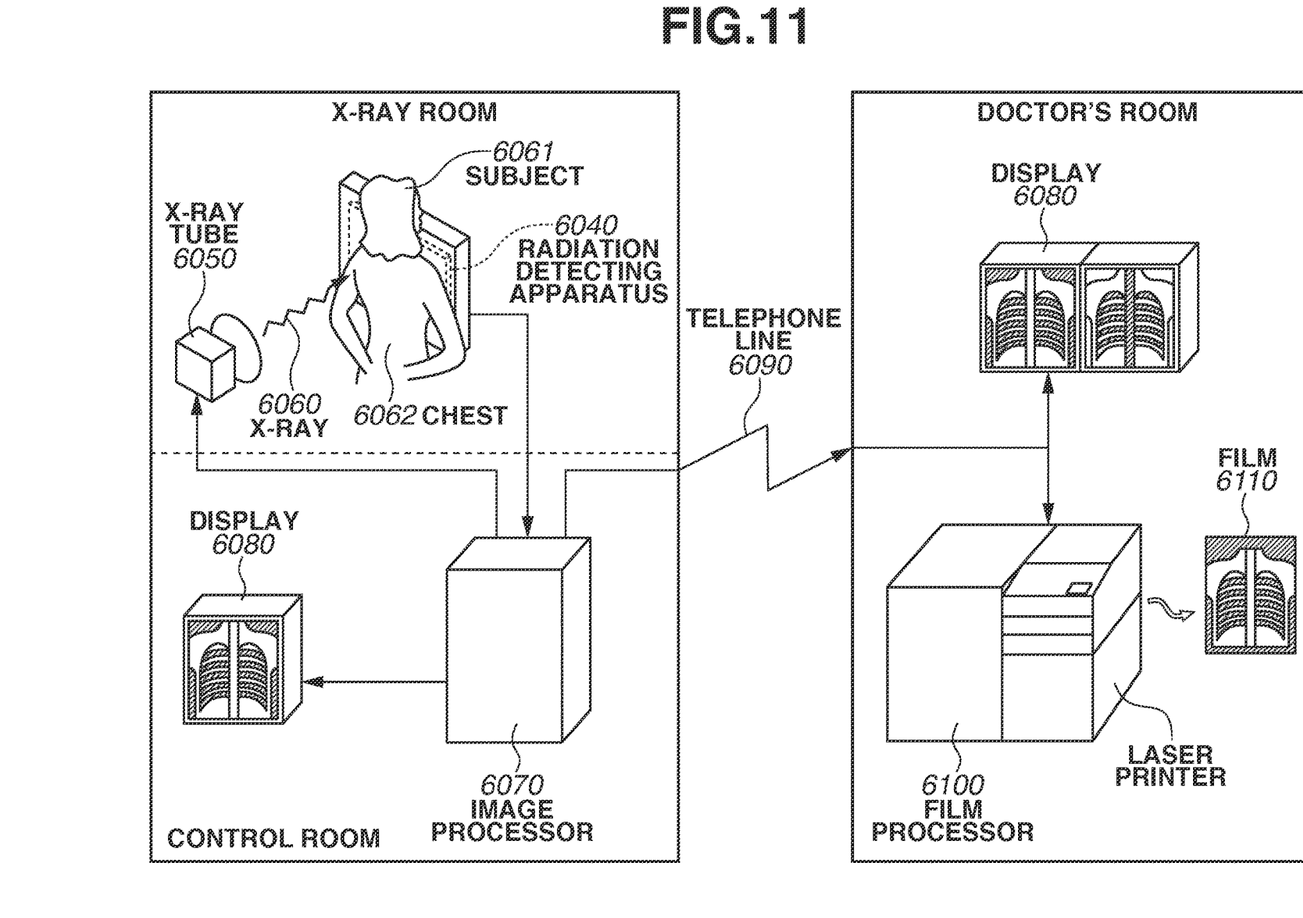
FIG. 11 is a schematic view illustrating one example of a configuration a radiation detecting system.

Next, an example in which the radiation detecting apparatus 100 is applied to a radiation detecting system is described with reference to FIG. 11. An X-ray 6060 generated by an X-ray tube 6050 serving as a radiation source is transmitted through a chest 6062 of a subject 6061 (patient) and enters a radiation detecting apparatus 6040 typified by the radiation detecting apparatus 100 described above. The X-ray, which has entered the radiation detecting apparatus 6040, includes internal body information of the subject 6061. A scintillator 216 emits light in response to the entrance of the X-ray, and a photoelectric conversion element photoelectrically converts such light to acquire electric information. Such information is converted into digital information, and image processing is performed on the digital information by an image processor 607 serving as a signal processing apparatus. Then, the information can be viewed on a display 6080, serving as a display unit, in a control room. Such information can be transferred to a remote location by a transmission processing unit such as a telephone line 6090, and the transferred information can be displayed on a display 6081 serving as a display unit in a room such as a doctor's room in another location or stored in a recording medium such as an optical disk. A doctor thus can make a diagnosis in the remote location. Moreover, the information can be recorded in a film 6110 serving as a recording medium by a film processer 6100 serving as a recording unit.

Each of the above-described exemplary embodiments merely shows a specific example to implement the present invention, and the technical scope of the present invention should not be interpreted thereby in a limited manner. That is, the present invention can be implemented in various forms without departing from the technical concept or main characteristics thereof.

While the present invention has been described with reference to exemplary embodiments, it is to be understood that the invention is not limited to the disclosed exemplary embodiments.

This application claims the benefit of Japanese Patent Application No. 2016-135411, filed Jul. 7, 2016, and No. 2016-135412, filed Jul. 7, 2016, which are hereby incorporated by reference herein in their entirety.

What is claimed is:

1. A radiation detecting apparatus comprising:
   a scintillator configured to convert irradiated radiation into visible light;
   a pixel array in which a plurality of pixels that each converts the visible light converted by the scintillator into electric signals is arranged in a two-dimensional array form on a first surface of a substrate;
   a plurality of connection terminal portions arranged on a periphery of the pixel array on the first surface of the substrate and configured to electrically connect the pixel array to an external circuit; and
   a conductive member to which a constant potential is supplied,
   wherein the conductive member, the pixel array, and the scintillator are arranged in this order from a side irradiated with radiation, and the scintillator is arranged on the first surface side, and
   wherein the conductive member is arranged in a region of a second surface opposite to the first surface of the substrate but does not extend to a region opposite to the plurality of connection terminal portions on the first surface.

2. The radiation detecting apparatus according to claim 1, wherein an end portion of the conductive member is positioned on the second surface and marks a boundary between the region in which the pixel array is arranged and the region opposite to the plurality of connection terminal portions.

3. The radiation detecting apparatus according to claim 1, wherein a part of an end portion of the conductive member is positioned on the second surface and marks a boundary between the regions opposite to the plurality of connection terminal portions.

4. The radiation detecting apparatus according to claim 1, further comprising a connecting portion configured to electrically connect the conductive member to a constant potential member that supplies a constant potential to the conductive member,
wherein the connecting portion is arranged so as to pass between regions provided on the second surface and opposite to the plurality of connection terminal portions.

5. The radiation detecting apparatus according to claim 4, wherein the plurality of connection terminal portions includes a plurality of first connection terminal portions arranged along a first side of the substrate and a plurality of second connection terminal portions arranged along a second side adjacent to the first side of the substrate,
wherein the plurality of first connection terminal portions is electrically connected to a drive circuit that drives the pixel array,
wherein the plurality of second connection terminal portions is electrically connected to a readout circuit that reads out electric signals from the pixel array, and
wherein the connecting portion is arranged on the second side of the substrate so as to pass between the regions provided on the second surface and opposite to the plurality of connection terminal portions.

6. The radiation detecting apparatus according to claim 5, further comprising:
a plurality of first flexible wiring boards electrically connected to the plurality of first connection terminal portions; and
a plurality of second flexible wiring boards electrically connected to the plurality of second connection terminal portions,
wherein the connecting portion is arranged so as to pass between the plurality of second flexible wiring boards.

7. The radiation detecting apparatus according to claim 4, further comprising a supporting member configured to support the conductive member, the substrate, and the scintillator from a side of the scintillator,
wherein the constant potential member is the supporting member.

8. The radiation detecting apparatus according to claim 7, wherein the supporting member includes a base and a radiation absorption plate arranged between the scintillator and the base, and
wherein the constant potential member is the base.

9. The radiation detecting apparatus according to claim 8, wherein the scintillator includes a scintillator layer configured to convert radiation into visual light, and a protection member configured to protect the scintillator layer by covering the scintillator layer and at least a part of the first surface of the substrate, and
wherein the protection member includes a conductive layer to which a constant potential is supplied.

10. The radiation detecting apparatus according to claim 9, further comprising a housing configured to store the conductive member, the base, the scintillator, and the supporting member, and
wherein the base is grounded with the housing to supply the constant potential to the conductive member.

11. The radiation detecting apparatus according to claim 1, further comprising another conductive member arranged on a side of the conductive member, the side being irradiated with radiation and supplied with a constant potential,
wherein the other conductive member is larger than an orthogonal projection of the conductive member with respect to the other conductive member.

12. A radiation detecting apparatus comprising:
a scintillator configured to convert irradiated radiation into visible light;
a pixel array in which a plurality of pixels that each converts the visible light converted by the scintillator into electric signals is arranged in a two-dimensional array form on a first surface of a substrate;
a first conductive member fixed on a second surface opposite to the first surface of the substrate and supplied with a constant potential; and
a second conductive member to which a constant potential is supplied,
wherein the second conductive member, the first conductive member, the pixel array, and the scintillator are arranged in this order from a side irradiated with radiation, and the scintillator is arranged on a first surface side, and
wherein the second conductive member is larger than an orthogonal projection of the first conductive member with respect to the second conductive member.

13. A radiation detecting system comprising:
the radiation detecting apparatus according to claim 1; and
a signal processing apparatus configured to process electric signals acquired by the radiation detecting apparatus.

14. A radiation detecting system comprising:
the radiation detecting apparatus according to claim 12; and
a signal processing apparatus configured to process electric signals acquired by the radiation detecting apparatus.

15. A manufacturing method for a radiation detecting apparatus including a scintillator configured to convert irradiated radiation into visible light, a pixel array in which a plurality of pixels that each converts the visible light converted by the scintillator into electric signals is arranged in a two-dimensional array form on a first surface of a substrate, a plurality of connection terminal portions arranged on a periphery of the pixel array on the first surface of the substrate and configured to electrically connect the pixel array to an external circuit, and a conductive member to which a constant potential is supplied, the conductive member, the pixel array, and the scintillator being arranged in this order from a side irradiated with radiation and the scintillator being arranged on a first surface side, the manufacturing method comprising:
arranging the conductive member in a region of a second surface opposite to the first surface of the substrate except for a region opposite to the plurality of connection terminal portions.

16. The radiation detecting apparatus manufacturing method according to claim 15, wherein, in the arranging, a connecting portion that electrically connects the conductive member to a constant potential member that supplies a constant potential to the conductive member is arranged in such a manner that the connecting portion passes between regions provided on the second surface and opposite to the plurality of connection terminal portions.

17. The radiation detecting apparatus manufacturing method according to claim 15, further comprising electrically connecting a printed circuit board to the plurality of connection terminal portions via a plurality of flexible wiring boards by connecting the plurality of flexible wiring boards to the plurality of connection terminal portions by heat pressure processing using an anisotropic conductive film in a state in which a receiving member is arranged in a region provided on the second surface and opposite to the first surface of the substrate and opposite to the plurality of connection terminal portions, wherein the region provided on the second surface opposite to the first surface of the substrate and opposite to the plurality of connection terminal portions is larger than a portion of the receiving member, the portion contacting the substrate.

18. The radiation detecting apparatus manufacturing method according to claim 17, further comprising inspecting electric characteristics of the pixel array, the plurality of flexible wiring boards and the printed circuit board, wherein, in the inspecting, the conductive member is electrically connected to at least one of the plurality of printed circuit boards via the connecting portion, and a constant potential is supplied to the conductive member.

19. The radiation detecting apparatus manufacturing method according to claim 18, further comprising removing, in a case where a failure is found in any one of the plurality of flexible wiring boards in the inspecting, any flexible wiring board having a failure in which the connecting portion is electrically disconnected from at least one of the plurality of printed circuit boards, from the plurality of connection terminal portions.

\* \* \* \* \*